United States Patent [19]
Aldrich et al.

[11] Patent Number: 5,299,245
[45] Date of Patent: Mar. 29, 1994

[54] SPACER GRID FOR A NUCLEAR FUEL ASSEMBLY

[75] Inventors: Michael E. Aldrich, Forest; David A. Farnsworth, Lynchburg; Charles D. Morgan, Lexington; Jeffrey S. Tucker, Lynchburg, all of Va.

[73] Assignee: B&W Fuel Company, Lynchburg, Va.

[21] Appl. No.: 970,760

[22] Filed: Nov. 2, 1992

[51] Int. Cl.$^5$ .............................................. G21C 3/34
[52] U.S. Cl. .................... 376/439; 376/443
[58] Field of Search ............. 376/439, 438, 442, 462, 376/443; 976/DIG. 74, DIG. 79, DIG. 80, DIG. 81

[56] References Cited

U.S. PATENT DOCUMENTS

| | | | |
|---|---|---|---|
| 3,379,617 | 4/1968 | Andrews et al. | 376/442 |
| 3,395,077 | 7/1968 | Tong | 376/439 |
| 3,920,515 | 11/1975 | Ferrari et al. | 376/442 |
| 3,933,584 | 1/1976 | Litt | 376/439 |
| 4,692,302 | 9/1987 | DeMario et al. | 376/439 |
| 5,112,571 | 5/1992 | Orii et al. | 376/439 |

Primary Examiner—Donald P. Walsh
Assistant Examiner—Meena Chelliah
Attorney, Agent, or Firm—Robert J. Edwards; D. Neil LaHaye

[57] ABSTRACT

A spacer grid for a nuclear fuel assembly. A plurality of metal strips are interleaved on edge to define a plurality of individual cells. Each cell is sized to receive a single nuclear fuel rod. A series of projections, grid mixing vanes, extend from one edge of each metal strip and are alternately bent to extend on opposite sides of the metal strip. The alternating projections provide four grid mixing vanes that extend into each individual cell.

2 Claims, 3 Drawing Sheets

1

SPACER GRID FOR A NUCLEAR FUEL ASSEMBLY

BACKGROUND OF THE INVENTION

Field of the Invention

The present invention is generally related to nuclear fuel assembly spacer grids and more particularly to mixing vanes in the spacer grids.

General Background

Fuel assemblies for nuclear reactors are formed from a number of fuel rods held in position by spacer grids located along the length of the fuel rods. The spacer grids, interleaved or crisscrossing metal strips on edge, provide an individual cell for each fuel rod. Some spacer grids are provided with a series of projections, grid mixing vanes, that serve to cause a predetermined turbulence and mixing of coolant as it flows through the spacer grids and around the fuel rods. During grid and fuel assembly fabrication, some of the mixing vanes can be accidentally bent. This can have at least two adverse effects. One is that the bent vane then has a different effect on coolant flow and may cause a greater pressure drop in coolant flow. This can degrade the critical heat flux. Another effect is that a mixing vane bent closer to a fuel rod creates the potential for fuel rod fretting and mixing vane breakage. Known grid assemblies are not directed to such problems.

SUMMARY OF THE INVENTION

The present invention addresses the above problems in a straightforward manner. What is provided is a grid assembly having grid mixing vanes that are internal to the overall envelope of the grid assembly. Multiple metal strips are interleaved together on edge to define a plurality of individual cells each sized to receive a single nuclear fuel rod. The metal strips are each provided with a series of projections that extend from one edge. The projections are bent relative to the metal strips in an alternating side to side fashion such that four of the projections, which form mixing vanes to direct coolant flow toward the interior of the cells, preferably have a maximum bend angle of 90 degrees relative to the metal strips.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
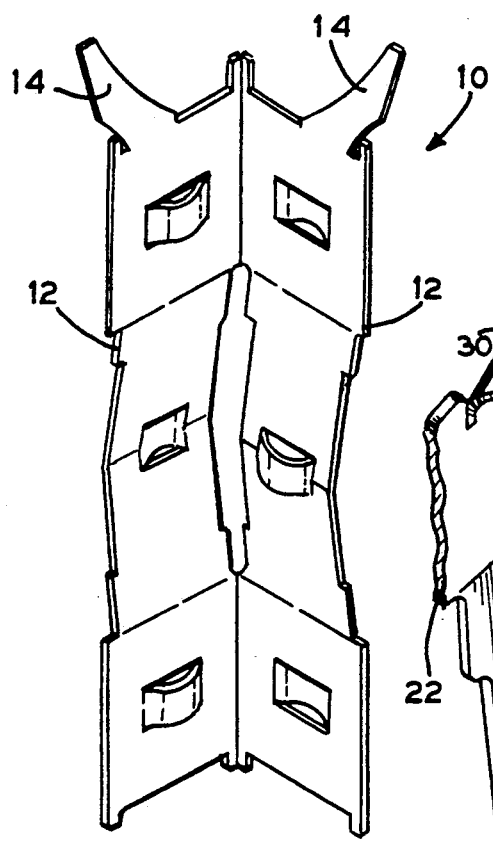
FIG. 1 illustrates a portion of a conventional spacer grid.

FIG. 1 illustrates a portion of a conventional spacer grid 10. Spacer grid 10 is formed from interleaved metal strips 12. Projections 14 extend from the top edge of metal strips 12 such that two projections 14 extend above and beyond the overall envelope formed by metal strips 12 toward the fuel rod (not shown) received in each of the individual cells formed by the assembly. This makes projections 14 which are grid mixing vanes for directing coolant flow toward the fuel rods, more susceptible to bending during assembly of spacer grid 10 and during loading of fuel rods therein.

Figure 2:
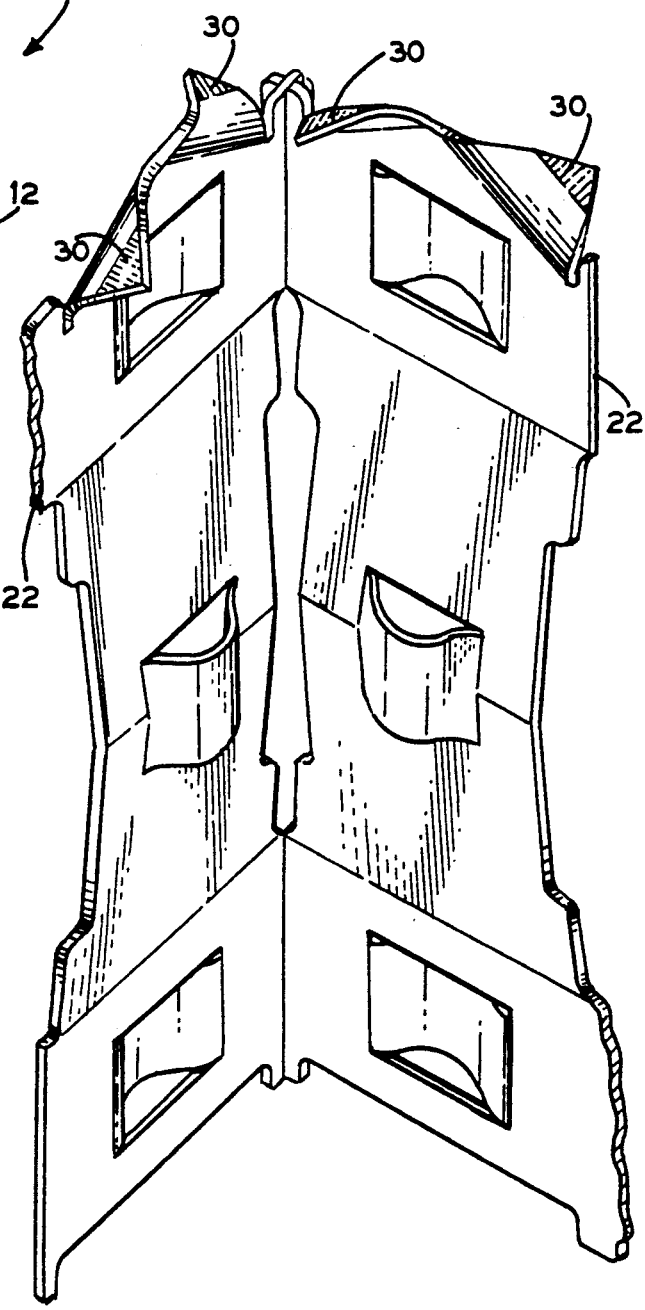
FIG. 2 is a top view of one of the metal strips used in the invention.
Figure 3:
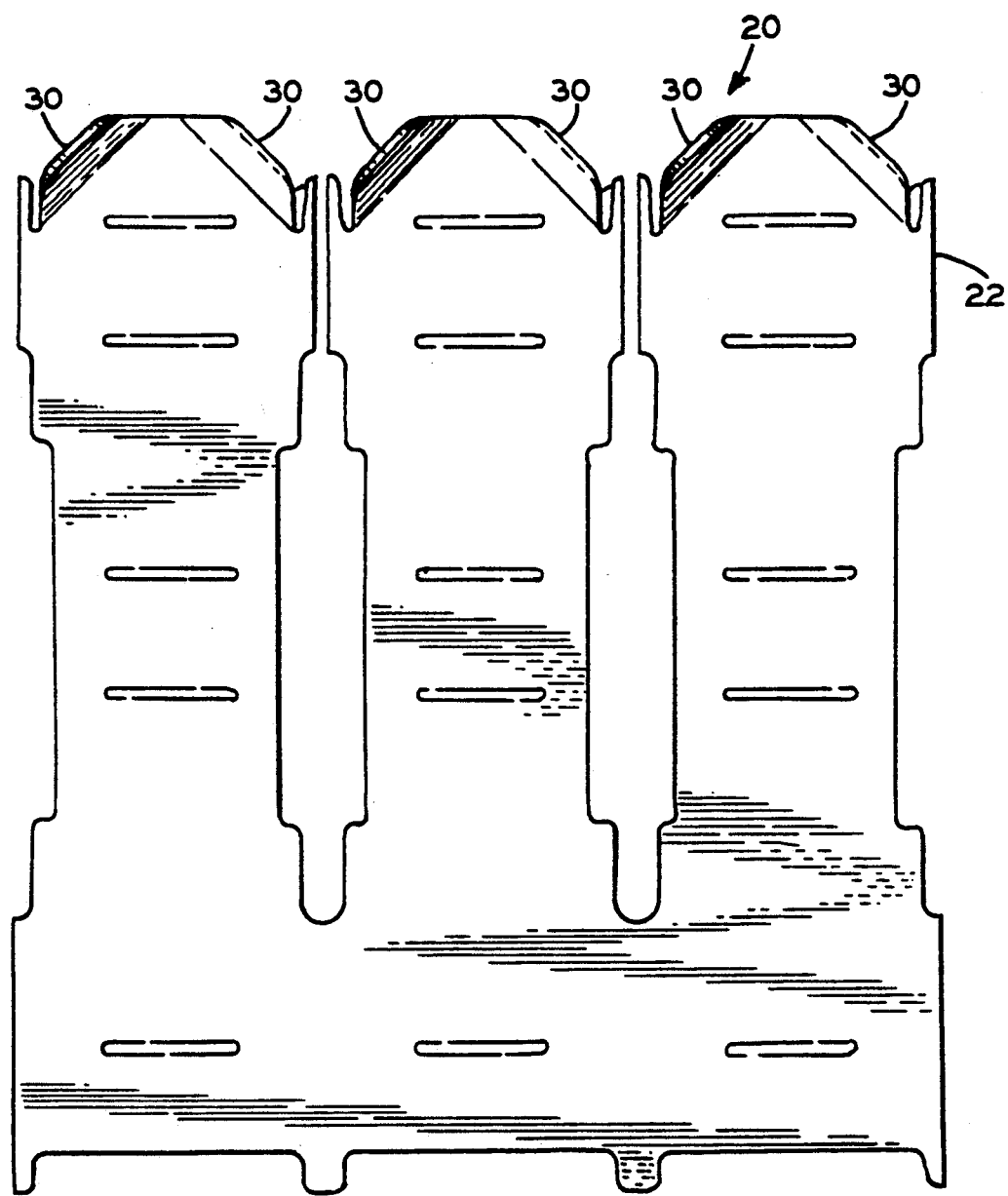
FIG. 3 is a side view of the invention.
Figure 4:
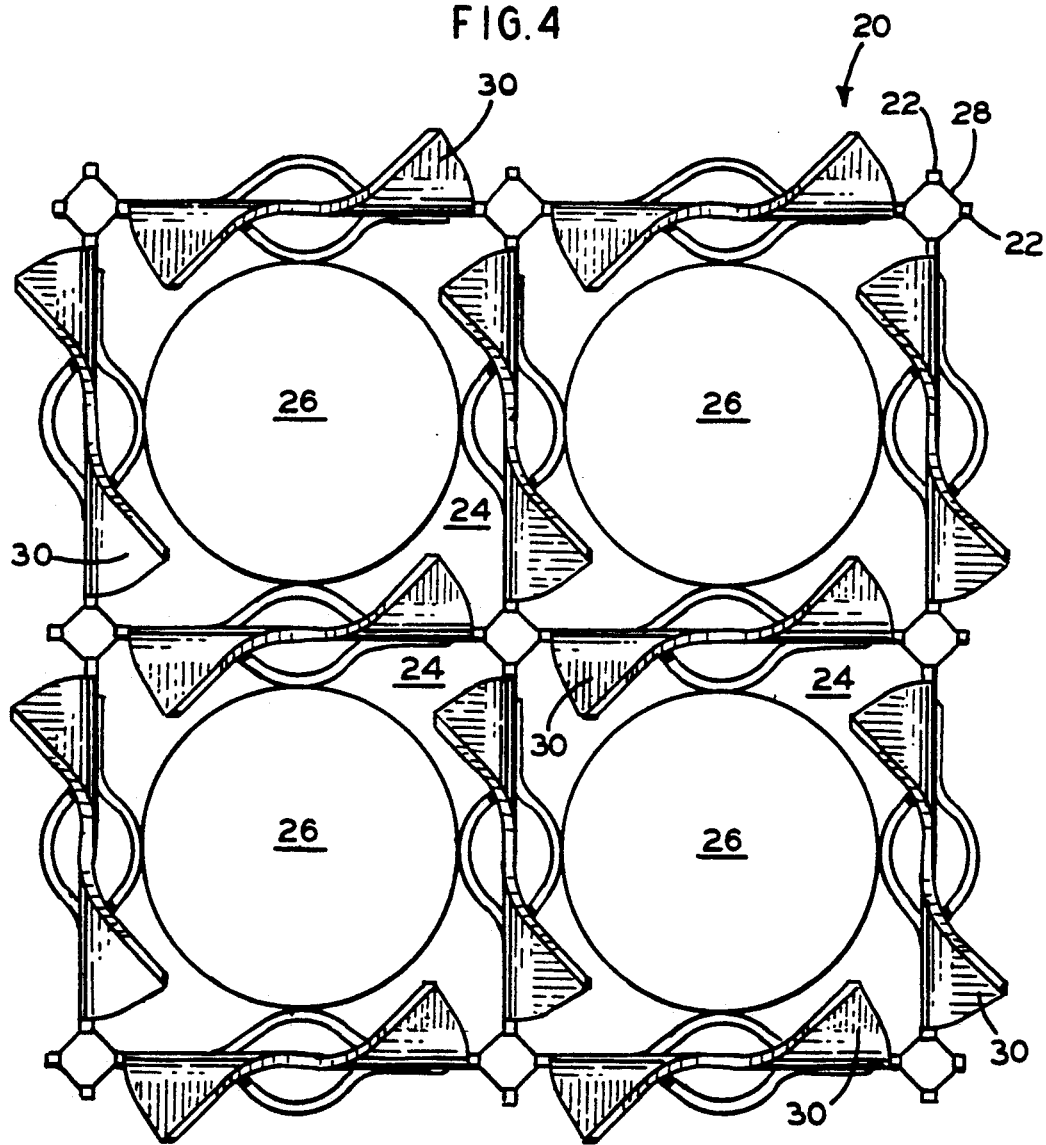
FIG. 4 is a top view of the invention.

The invention is generally indicated by the numeral 20 in FIGS. 3 and 4. As best seen in FIG. 4, spacer grid 20 is formed from a plurality of metal strips 22 that are interleaved or crisscrossed on edge to define a plurality of individual cells 24 to receive a single nuclear fuel rod 26. For ease of illustration, only a portion of an assembly and two fuel rods 26 are shown. Metal strips 22 are welded together as indicated at numeral 28. Each metal strip is provided with a series of projections 30, as best seen in FIG. 2, that extend from one edge thereof. Projections 30 are bent relative to metal strips 22 in an alternating fashion so as to extend on either side of metal strips 22. In the preferred embodiment, projections 30 have a maximum bend angle relative to metal strips 22 of 90 degrees. This provides an advantage during assembly and loading of fuel rods 26. If a projection 30 is accidentally bent, it will be moved farther away from fuel rod 26 as opposed to being moved closer to fuel rod 26 which is the case with conventional spacer grid 10 in FIG. 1. As best seen in FIG. 4, the alternating side-to-side position of projections 30 provides four projections 30 per individual cell 24 when metal strips 22 ar assembled to form spacer grid 20. As best seen in FIG. 3, another advantage of the 90 degree bend of projections 30 is that projections 30 remain internal relative to the overall envelope of spacer grid 20. That is, projections 30 do not extend beyond the vertical space normally occupied by metal strips 22 when spacer grid 20 is assembled. This helps to reduce the likelihood that projections 30 will be bent or broken during assembly.

During normal reactor operation, projections 30 function as grid mixing vanes that direct coolant flow from the center of the flow channel into the rod-to-rod gaps at four places in each individual cell 24. This results in critical heat flux enhancement, conduction of heat from fuel rods 26 to the coolant, that is, at a minimum, equal to or better than mixing vanes used on conventional spacer grids. Overall pressure drop of coolant flow is also reduced as a result of projections 30 being internal to the overall grid envelope.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention:

1. A spacer grid for a nuclear fuel assembly, comprising:
   a. a plurality of metal strips that are interleaved on edge to define a plurality of individual cells wherein each cell is sized to receive a single nuclear fuel rod; and
   b. a series of grid mixing vanes that extend from one edge of each of said metal strips and are internal to the overall envelope of the spacer grid, said mixing vanes being bent relative to said metal strips in an alternating opposing pattern such that four of said mixing vanes extend into each of the individual cells whereby said mixing vanes direct coolant flow within each individual cell into the gaps between adjacent nuclear fuel rods.

2. The spacer grid of claim 1, wherein said mixing vanes are bent at a maximum 90 degree angle relative to said metal strips.

* * * * *